UNITED STATES PATENT OFFICE.

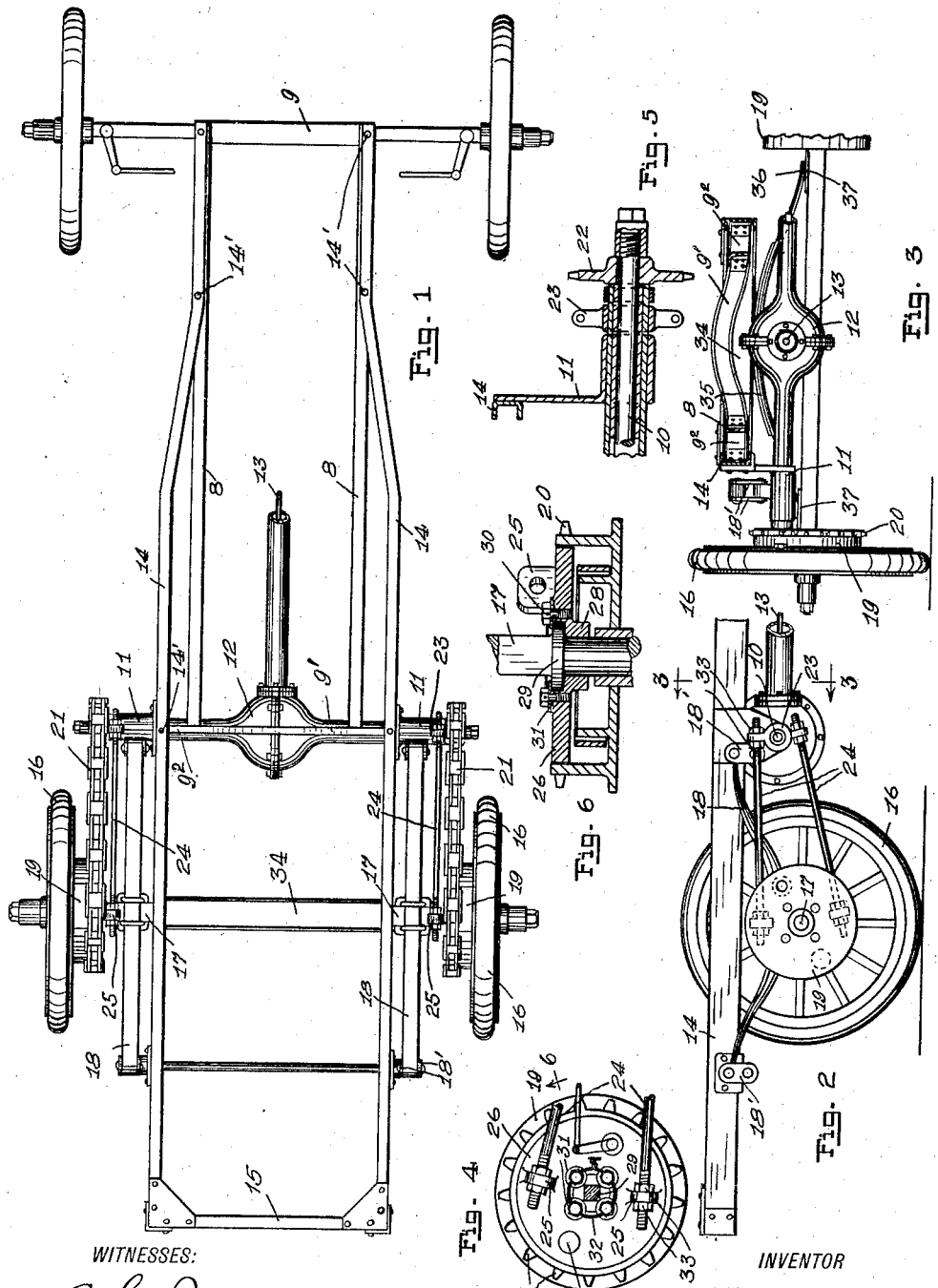

ALBERT D. SMITH, OF SEATTLE, WASHINGTON.

TRUCK ATTACHMENT FOR AUTOMOBILES.

1,363,022.

Specification of Letters Patent.

Patented Dec. 21, 1920.

Application filed March 16, 1915. Serial No. 14,803.

*To all whom it may concern:*

Be it known that I, ALBERT D. SMITH, a citizen of the United States, residing at Seattle, in the county of King and State of Washington, have invented certain new and useful Improvements in Truck Attachments for Automobiles, of which the following is a specification.

This invention relates to an apparatus or mechanism for forming a truck adapted to carry heavy loads, from a comparatively light automobile such as a light touring car or pleasure car.

Among the objects of this invention are to provide means whereby a light motor vehicle may be readily converted into a truck adapted to carry heavy loads; to provide an auxiliary frame and truck wheels which may be readily applied to a light automobile and means whereby the truck wheels may be driven from the rear axle of the automobile; and in general, to provide such an improved structure and combination of parts as will be more fully described hereinafter.

In the accompanying drawings illustrating this invention:

Figure 1 is a plan view of an automobile chassis with my truck forming attachment applied thereto;

Fig. 2 is a side view of the rear portion of the truck;

Fig. 3 is a vertical section on the line 3—3 of Fig. 2, parts being broken away and other parts shown in elevation;

Fig. 4 is a detail of one of the sprocket wheels and brakes;

Fig. 5 is a longitudinal sectional view of the jack-shaft; and

Fig. 6 is a horizontal sectional detail of one of the sprocket wheels and brakes.

In these drawings I have illustrated the chassis of a light automobile, only the more essential parts being shown. The vehicle frame comprises the side members 8, 8 and front cross bar 9, the usual rear cross bar being replaced by a longer bar 9', which extends out to connect with the side bars 14 of my auxiliary frame. The rear axle is provided with the usual shafts 10, which connect with a differential gearing mounted in the housing 12, and driven by a propeller shaft 13.

My auxiliary frame comprises side bars 14, which are preferably made of channels, and are bent inwardly at their forward ends so as to engage with and overlap the side bars 8 of the automobile frame for some distance. The side bars are fastened by means of bolts or rivets 14'. The side bars 14 are connected by the cross bars 9', 34 and 15, so as to make a rigid and substantial structure which is somewhat wider than the usual automobile frame, and also extends for a considerable distance beyond the rear end of the automobile frame. The side bars 14 are provided with brackets 11 having bearings in their lower ends for the housing of the rear axle. The rear part of the auxiliary frame is provided with an axle 17 and truck wheels 16, which are made sufficiently heavy so as to carry the increased load. The frame is mounted on the axle in the usual manner, by means of springs 18, which connect with shackles 18', which shackles are secured to the frame in the ordinary manner. I also provide a cross spring 35, which is connected to the cross bar 34 and adapted to bear at the ends on the plates 37, secured to the axle 17.

The rear wheels of the automobile are taken off and sprocket wheels 22 attached to the axle shafts 10. These sprocket wheels are connected by chains 21 with sprocket wheels 20, secured to the truck wheels 16. Disks 26 having hubs 28 are mounted on the rear axle 17, being held longitudinally of the axle by means of screws 30 having washers 31, which engage with the inner side of a collar 29, these screws being held in adjusted position by means of a wire 32. The disk 26 is provided with lugs 25, having holes therethrough for torsion rods 24, which rods connect at their opposite ends with yokes 23 mounted on the ends of the rear axle housing. The rods 24 are provided with adjusting nuts 33, whereby the axle 17 may be properly positioned and the tension on the chains may be adjusted. The disks 26 are provided with holes 27 for the brake shafts.

By means of my improved apparatus, it will be seen that a light automobile may be readily converted into a truck for hauling heavy loads, the rear axle of the automobile becoming the jack-shaft and serving to drive the truck wheels, the driving ratio being such that, although the speed of the vehicle is reduced, greater driving power is available for turning the truck wheels. In the commercial utilization of my invention, I am enabled to make a one ton delivery truck from a light automobile such as the Ford. My improved apparatus forms the rear portion of the motor truck, and with a frame 14 feet in length, gives a body space of 8 ft. and 10 inches, whereby large roomy bodies may be provided for carrying the load. The frame of my improved attachment is made of four inch steel channels, which telescope and reinforce the automobile frame. The cross bar 9' which fastens the two frames together insures great strength and rigidity. It will be readily seen that other forms of torsion arms may be utilized in place of the one described, and other changes may be made without departing from the scope of this invention, and therefore I do not wish to limit myself to the exact construction herein shown and described, except as specified in the following claims, in which I claim:

1. The combination with the complete operative frame of an ordinary automobile, of an auxiliary truck frame extending beyond the automobile frame and adapted to receive a platform or truck body, means for securing said frames directly together to form a rigid combined frame, a pair of truck wheels and axle, means for mounting the auxiliary frame yieldingly on said axle, and means for driving the truck wheels from the rear axle of the automobile.

2. The combination with an automobile chassis including the usual complete operative frame, of an auxiliary truck frame embracing the automobile frame and extending from the front end of the automobile frame some distance rearwardly thereof and adapted to receive a truck body, means for fastening said frames together, bearings on the auxiliary frame for the housing of the rear axle of the automobile, sprockets secured to the rear axle shafts of the automobile in place of the rear wheels, a pair of truck wheels and axle for said auxiliary frame, sprockets connected with said wheels, and chains from the first-named sprockets to the last-named sprockets, for driving the truck wheels.

3. The combination with an automobile chassis including the usual complete operative frame, of an auxiliary frame comprising parallel side bars and cross bars, said auxiliary frame being wider than the automobile frame and extending rearwardly thereof and lying in the same horizontal plane, means for fastening said frames rigidly and permanently together, bearings on the auxiliary frame engaging with the housing of the automobile rear axle, sprocket wheels mounted on the rear axle shafts, truck wheels and axle for said auxiliary frame, springs carrying said auxiliary frame on said axle, torsion rods connecting between the rear axle of the automobile and the truck axle, sprocket wheels connected with the truck wheels, and chains for driving said sprocket wheels from the first-named sprocket wheels.

4. The combination with an automobile chassis including the usual operative frame and having its rear wheels removed, of an auxiliary truck frame secured directly to the automobile frame and extending rearwardly thereof to form a single combined frame, truck wheels and axle for supporting said auxiliary frame, and means for driving said wheels from the power furnished by the automobile, the arrangement being such that the auxiliary frame is adapted for receiving a truck body, and the load will be carried mainly upon the truck wheels.

5. The combination with an automobile chassis having a regular operative frame, of an auxiliary extension frame for increasing the length of said automobile frame, said extension frame extending beyond the rear end of the regular automobile frame in substantially the same horizontal plane, means for securing said frames together to form a rigid combined frame, a pair of wheels and axle, and means for mounting the auxiliary frame yieldingly on said wheels and axle.

6. The combination with an automobile chassis including the usual operative frame and having its rear wheels removed, of an auxiliary truck frame secured to the automobile frame and extending rearwardly thereof to form a single combined frame, truck wheels and axle for supporting said auxiliary frame, and means for driving said wheels by the power furnished by the automobile, the arrangement being such that the auxiliary frame is adapted for receiving a truck body.

Signed at Seattle, Wash., this 10th day of March, 1915.

ALBERT D. SMITH.

Witnesses:
E. PETERSON,
PIERRE BARNES.